US008799236B1

(12) United States Patent
Azari et al.

(10) Patent No.: US 8,799,236 B1
(45) Date of Patent: Aug. 5, 2014

(54) DETECTING DUPLICATED CONTENT AMONG DIGITAL ITEMS (75) Inventors: David R. Azari, Seattle, WA (US);
Denis V. Batalov, Seattle, WA (US);
Tanvi M. Bhadbhade, Seattle, WA (US);
Lee M. Miller, Seattle, WA (US); Alan Kipust, Mercer Island, WA (US);
Theresa M. Hollis, Edmonds, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/524,155

(22) Filed: Jun. 15, 2012

(51) Int. Cl.
*G06F 7/00* (2006.01)
*G06F 17/00* (2006.01)

(52) U.S. Cl.
USPC .......................................... 707/688; 707/689

(58) Field of Classification Search
None
See application file for complete search history.

(56) References Cited

U.S. PATENT DOCUMENTS

| | | | | |
|---|---|---|---|---|
| 7,716,144 | B2 * | 5/2010 | McSherry et al. | 706/12 |
| 8,266,115 | B1 * | 9/2012 | Park et al. | 707/692 |
| 8,280,861 | B1 * | 10/2012 | Park et al. | 707/692 |
| 2005/0195660 | A1 * | 9/2005 | Kavuri et al. | 365/189.05 |
| 2006/0041597 | A1 * | 2/2006 | Conrad et al. | 707/200 |
| 2007/0038673 | A1 * | 2/2007 | Broussard et al. | 707/104.1 |
| 2007/0038924 | A1 * | 2/2007 | Beyer et al. | 715/507 |
| 2008/0103790 | A1 * | 5/2008 | Abernethy et al. | 705/1 |
| 2009/0089314 | A1 * | 4/2009 | Hicks | 707/102 |
| 2009/0089326 | A1 * | 4/2009 | Balasubramanian | 707/104.1 |
| 2009/0259650 | A1 * | 10/2009 | Schuil | 707/5 |
| 2010/0070532 | A1 * | 3/2010 | Moribe et al. | 707/783 |

OTHER PUBLICATIONS

Brin, et al., "Copy Detection Mechanisms for Digital Documents," SIGMOD '95 Proceedings of the 1995 ACM SIGMOD International Conference on Management of Data, May 1995, 12 pages.

Manber, Udi, "Finding Similar Files in a Large File System", WTEC'94 Proceedings of the USENIX Winter 1994 Technical Conference on USENIX Winter 1994 Technical Conference, Jan. 1994, pp. 1-10.

* cited by examiner

*Primary Examiner* — Tony Mahmoudi
*Assistant Examiner* — Tuan A Pham
(74) *Attorney, Agent, or Firm* — Lee & Hayes, PLLC (57) ABSTRACT

When a digital item is submitted for publication, an automated system may determine whether the digital item includes content from other digital items. In some implementations, when the digital item is an electronic book (eBook), the automated system may select sets of words from the eBook and compute hash codes, such that each hash code corresponds to a set of words. The automated system may compare the computed hash codes with retained hash codes associated with other electronic books to determine whether the digital item includes duplicate content.

28 Claims, 7 Drawing Sheets

DETECTING DUPLICATED CONTENT AMONG DIGITAL ITEMS

BACKGROUND

Online publishing provides opportunities to make content available to the public more quickly and more cheaply than through traditional publishing channels. As a result, a large volume of online content can be made available at a scale that traditional publishing may find difficult to match. However, publishing large volumes of content places a burden on publishers to identify and prevent publication of duplicate content, plagiarized content, and the like. For example, individuals may submit content for publication where the content is substantially similar to previously published content, such as public domain content.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Online publishers can quickly publish large numbers of digital items at a scale and speed that traditional publishers find difficult to match. Each of the digital items may include text content, graphical content, picture content, audio content, video content, other multimedia content, or combinations thereof. For example, the digital item may be an electronic book (eBook), a video item (e.g., a movie or a television show), an album (e.g., music or spoken word), and the like. The eBook may include text, photographic images, illustrations, drawings, and the like. The items may be acquired by individuals via one or more physical locations, via one or more sites (e.g. a site of a merchant, an online retailer site, etc.), or combinations thereof. In some cases, merchants may provide items acquired by individuals to locations specified by the individuals, such as via mobile services, delivery, etc. The acquisition of items by individuals may be achieved through various means of providing value for the items, such as purchasing items, renting items, borrowing items, trading items, bartering items, etc.

The terms "duplicate content" and "copied content" as used herein may refer to content from two or more sources that is substantially similar. For example, when an individual copies a portion of content from a first source and then makes minor modifications to the content, the copied content is substantially similar and may be determined to be duplicate content. To illustrate, the individual may change a proper noun in the copied content to another proper noun (e.g., replace "John" with "David") or change from a masculine pronoun to a feminine pronoun.

When a digital item is submitted to an online publisher for publication, the online publisher may determine whether at least a portion of the digital item includes duplicate content, e.g., content that is a duplicate (e.g., a copy) of content included in other digital items. Based on how much of the content in the digital item is duplicate content, the online publisher may determine whether or not to publish the digital item. For example, an online publisher may determine to publish a submitted digital item that annotates, analyzes, and/or illustrates a public domain book. The online publisher may decline to publish a digital item that is more than fifty-percent duplicate content. The duplicate content may be from one or more other digital items. For example, an eBook may be determined to include duplicate content when the eBook includes excerpts from one or more other eBooks. As defined herein, duplicate content may include content to which minor word substitutions have been made, such as substituting one set of nouns with another set of nouns, substituting one set of pronouns with another set of pronouns, substituting one set of verbs with another set of verbs, and so on. Such minor word substitutions typically do not affect the copyright status of the duplicate content.

In some implementations, the entire process of determining whether a digital item includes duplicate content may automated. For example, the online publisher may receive a digital item electronically (e.g., via an online submission service). Software executing on one or more servers may automatically (e.g., without human interaction) determine whether the digital item includes duplicate content and determine whether or not to publish the digital item. In some cases, some digital items submitted for publishing may be placed in a queue and flagged for human review. For example, a digital item that includes more than a threshold amount of duplicate content may be flagged for human review. To illustrate, the online publisher may publish a digital item that annotates, analyzes, and/or illustrates a public domain book. The human reviewer may review a flagged digital item to determine whether the added content (e.g., annotations, analysis, illustrations, and the like) are sufficient to recommend publication of the digital item. As another illustration, an author may submit for publication a digital item that includes a compilation of previously published digital items. For example, the author may submit for publication an eBook that includes a compilation of previously published short stories. The automated system may determine that the digital item includes duplicate content from multiple other digital items and flag the digital item for manual review. The human reviewer may review the digital item and determine that the compilation is suitable for publication.

The automated system may be capable of determining whether a digital item includes duplicate content in real-time or near real-time (e.g., typically less than a few seconds), thereby enabling the automated system to handle a large volume of digital item submissions. Thus, the automated system may introduce little or no lag in the publication pipeline.

For illustration purposes, an eBook may be used as an example of a digital item. However, the techniques described herein may be used for various types of digital items, include eBooks, audio items (e.g., music items or audio books), video items (e.g., movies or television programs), images (e.g., photographs or graphics), or any combination thereof.

When the automated system receives a digital item, the digital item may be converted to a standardized format. For example, when an eBook is submitted, the automated system may remove formatting and/or markups to convert the content of the eBook to plain text. The automated system may convert letters to a uniform case, such as lower case. The automated system may remove stop words, e.g., words that do not add semantic meaning, such as "a," "the," "and," "was" and the like. In some implementations, in addition to converting the content of the eBook to plain text, images in the eBook may be converted to a standardized image format. The automated system may determine whether the digital item includes duplicate content by, substantially simultaneously, (1) determining whether the text of the eBook includes duplicate content and (2) determining whether the images in the eBook include duplicate content.

Figure 2:
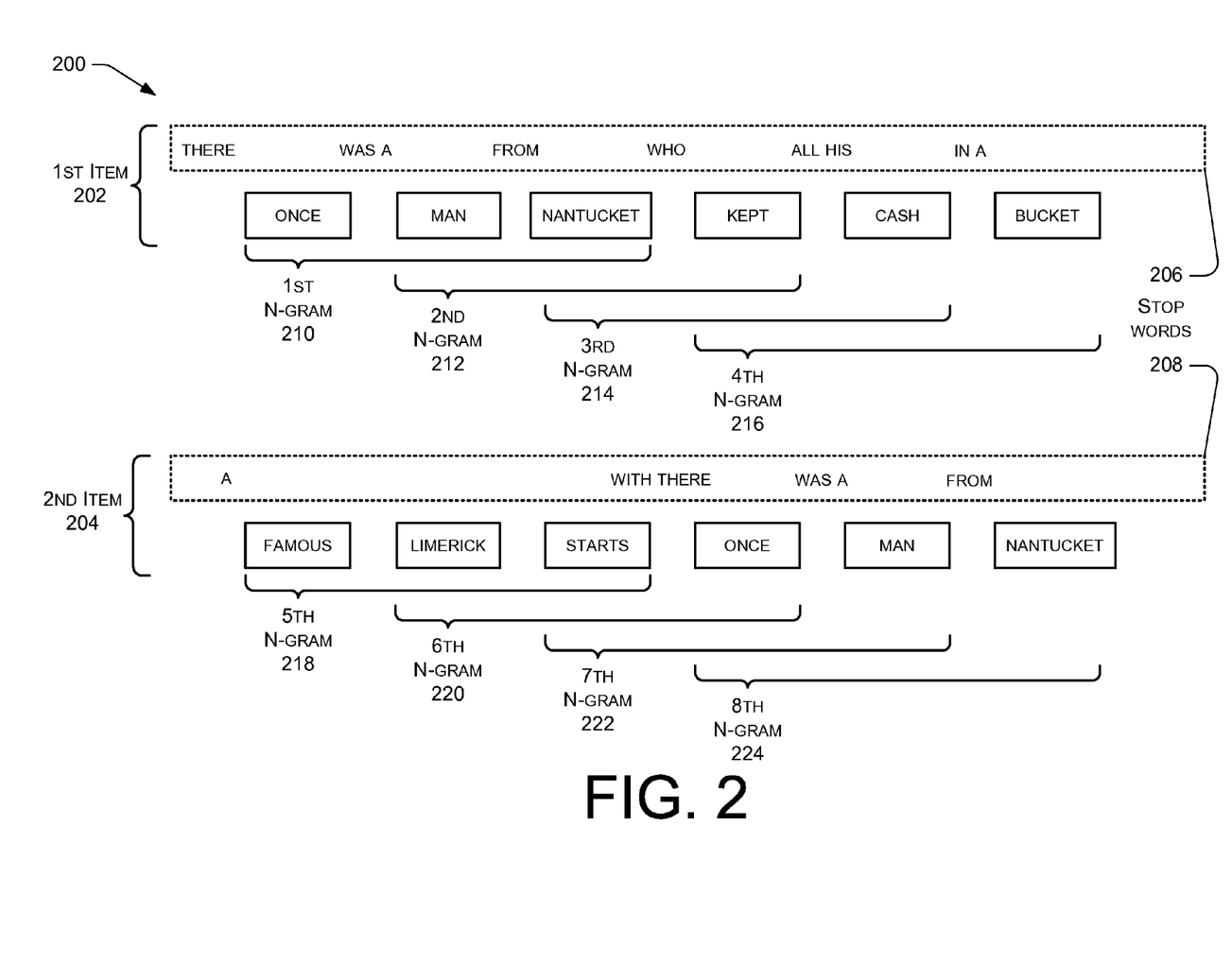
FIG. 2 is an illustrative architecture that includes selecting sets of words (N-grams) according to some implementations.

To enable the automated system to quickly identify whether a digital item includes duplicate content, the automated system may compute hash codes for at least a portion of the digital item and compare the hash codes with other hash codes associated with other digital items. A hashing algorithm is a function that maps large data sets of variable length, called keys, to smaller data sets of a fixed length. The values returned by a hash function may be referred to as hash codes. A hashing algorithm (e.g., a Java® hashing algorithm, a message digest 5 (MD5) hashing algorithm, or the like) with a relatively uniform distribution may be used to calculate the hash codes. For example, after the content of an eBook has been converted to a standardized format, the automated system may select multiple N-grams, where each N-gram is a set of N consecutive words (N>1). In some implementations, N may be an integer between 5 and 25. For example, when N is ten, the automated system may select a first N-gram of ten consecutive words, starting with the first word, and calculate a first hash code based on the first N-gram. The automated system may select a second N-gram of ten consecutive words, starting with the second word, and calculate a second hash code based on the second N-gram. The automated system may continue selecting N-grams and calculating hash codes until each word of the eBook is included in at least one N-gram or until a specified number of N-grams have been selected. In this example, there are N−1 words that overlap between an N-gram and a subsequent N-gram, such as between the first N-gram and the second N-gram. However, in other implementations, there may be less than N−1 words that overlap between an N-gram and a subsequent N-gram. For example, in an implementation in which one word overlaps, the second N-gram may start with the tenth word. As another example, in an implementation in which zero words overlap, the second N-gram may start with the eleventh word. FIG. 2 illustrates selecting N-grams of three words (e.g., N=3).

When N−1 words overlap between an N-gram and a subsequent N-gram, the number of hash codes calculated equals the number of words in the standardized format of the eBook. Comparing all the hash codes of an eBook to the all the hash codes associated with other eBooks to identify duplicate content (e.g., copied content) may be at least as computationally intensive as comparing all the words in the eBook with all the words in the other eBooks. To reduce the latency in identifying duplicate content, some of the hash codes computed for a digital item may be retained and associated with the digital item. The remaining hash codes computed for the digital item may be discarded. Determining which hash codes to retain may be done by identifying and retaining those hash codes with a particular mathematical property. For example, the hash codes that are divisible by a particular number, such as a power of two (e.g., $2^6$, $2^7$, $2^8$, and the like), may be retained while the remaining hash codes may be discarded.

The retained hash codes may be associated with a digital item using a data structure, such as a table, a linked list, and the like. Thus, the automated system may access a repository used to store the data structure that associates hash codes with multiple digital items. When a digital item (e.g., eBook) is submitted for publication, the automated system may convert the digital item to a standardized format and compute hash codes for sets (e.g., N-grams) of N consecutive words of at least a portion of the digital item. The automated system may compare the computed hash codes with the retained hash codes in the repository to determine whether the submitted digital item includes content copied from other digital items. For example, if more than a threshold number of the computed hash codes match the retained hash codes associated with a submitted digital item, then the automated system may determine that the submitted digital item includes an amount of duplicate content that renders the submitted digital item is unsuitable for publication. In some cases, an order of the hash codes in the submitted digital item and the matching retained hash codes may be used when determining whether the submitted digital item includes duplicate content. In other cases, the order of the hash codes may not be taken into consideration when determining whether the submitted digital item includes duplicate content.

In some implementations, if the automated system determines that the submitted digital item includes duplicate content, the automated system may perform an additional analysis to verify the duplicate content and/or rule out false positives. A false positive occurs when a computed hash code matches a retained hash code but the corresponding N-grams used to compute the hash codes are not identical. False positives may occur because the initial determination that the digital item includes duplicate content is based on comparing hash codes rather than comparing the content of the digital item.

To verify that a submitted digital item includes duplicate content, the automated system may identify the retained hash codes that match the computed hash codes of the submitted digital item and identify additional digital items that correspond to the matching retained hash codes. The automated system may calculate additional hash codes for N-grams of each of the additional digital items and compare the additional hash codes with the computed hash codes associated with the submitted digital item. Thus, the automated system may compare all the hash codes calculated for each of the additional digital items, rather than just the retained hash codes. When a hash code of one of the additional digital items matches a hash code of the submitted digital item, the automated system may compare the underlying N-grams. For example, when a first hash code that is computed based on a first N-gram of the submitted digital item matches a second hash code that is based on a second N-gram of one of the additional digital items, the automated system may compare the first N-gram with the second N-gram to determine whether the content was copied or whether the matching hash codes were a false positive. Thus, when hash codes match, the automated system may verify whether the submitted digital item includes duplicate content by comparing the underlying content used to calculate the matching hash codes.

In some cases, the automated system may also calculate forward and reverse scores. A forward score identifies how much content of the submitted digital item is included in a particular digital item and may be calculated for the particular digital item by dividing the total number of hash codes in the submitted digital item that match hash codes associated with the particular digital item by the total number of hash codes calculated for the particular digital item. A reverse score identifies how much of the content of the particular digital item is included in the submitted digital item and may be calculated by dividing the total number of hash codes in the particular digital item that match hash codes associated with the submitted digital item by the total number of hash codes calculated for the particular digital item. For example, a compilation A may include previously published items X, Y, and Z. To illustrate, an author may have published a compilation of previously published novellas. The forward scores for A with respect to X, Y, and Z may be 10%, 15%, and 12%, indicating that 10% of A is from X, 15% of A is from Y, and 12% of A is from Z. The reverse scores for A with respect to X, Y, and Z may be 100%, 98%, and 100%, indicating that 100% of X is included in A, 98% of Y is included in A, and 100% of Z is included in A. In this example, the 98% score for Y may be a result of the author revising Y for inclusion in the compilation A.

When the automated system identifies duplicate content and verifies that the content was copied from one or more additional digital items, based on an amount of the duplicate content, the automated system may flag the submitted digital item for human review. When the submitted digital item is flagged for review, additional information associated with the submitted digital item, such as the forward and reverse scores, names of the authors, names of the publishers, one or more categories associated with the digital item, and the like may be provided to the human reviewers. For example, each digital item in the repository may have one or more associated categories, such as a top seller category (e.g., based on sales of the item), a free public domain category (e.g., content that is in the public domain and is that is offered for free), a non-free public domain category (e.g., content that is in the public domain but that is offered for a fee), a private label rights category (e.g., a private label has provided publishing rights), a self-published category (e.g., content that is published by the author or otherwise self-published), a removed category (e.g., indicating that the content was removed from the catalog 138 in response to a request, such as a request made under the digital millennium copy right act (DMCA)), another type of category, or any combination thereof. The automated system, after verifying that the content of the submitted digital item includes content copied from additional digital items, may automatically send a message to a submitter of the digital item indicating that the digital item is unsuitable for publication.

Thus, an automated system may be used to determine, in near real-time, whether a digital item submitted for publication includes duplicate (e.g., copied) content. The digital item may include an eBook, a video item (e.g., a movie, television show, and the like), an audio item (e.g., an audio book, a music selection, a spoken word selection, and the like), another type of digital content, or any combination thereof. The automated system may compute hash codes of sets of words (e.g., N-grams) of the submitted digital item and compare the computed hash codes with retained hash codes associated with additional digital items. In some cases, the automated system may verify that the submitted digital item includes duplicate content by calculating and comparing additional hash codes associated with those digital items whose retained hash codes matched the computed hash codes of the submitted digital item. The automated system may calculate forward and reverse scores to identify how much duplicate content is included in the submitted digital item. The automated system may automatically determine whether or not to publish the submitted digital item. In some cases, the automated system may flag the submitted digital item for human review based on various factors, such as how much duplicate content is included in the submitted digital item. In some implementations, the automated system may automatically detect upload errors. For example, if a document is initially submitted for publication and then, at a later time, resubmitted for publication, the automated system may compare recently computed hash codes of a current version of the document with retained hash codes computed for a previous version of the document. The automated system may detect that an upload error occurred (1) if the amount of duplicate content is less than a predetermined amount, (2) if a number of hash codes that are computed differ by more than a predetermined number, or both. In response to detecting an upload error, the automated system may perform various actions, such as sending a notification to a submitter device, sending a notification to a submission service used by the submitter to submit the document, blocking processing of the version of the document that includes an upload error, another action, or any combination thereof.

Illustrative Framework

Figure 1:
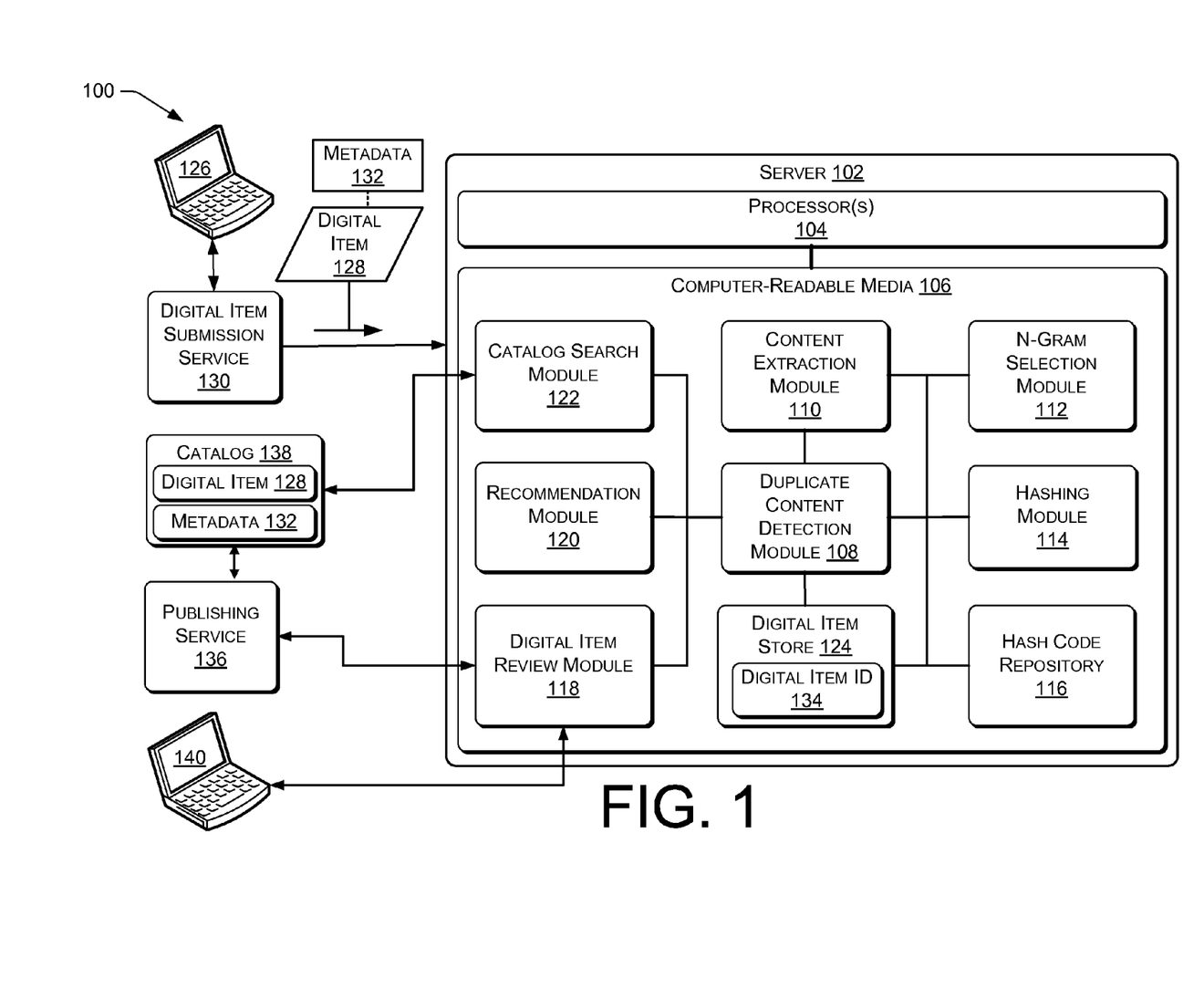
FIG. 1 is an illustrative architecture that includes a duplicate content detection module according to some implementations.

FIG. 1 is an illustrative architecture 100 that includes a duplicate content detection module according to some implementations. The architecture 100 includes a server 102 that may be comprised of multiple virtual servers, multiple physical servers, or a combination of both. The server 102 may include one or more processors 104 and a computer-readable media 106.

The computer-readable media 106 may include read-only memory, random access memory (RAM), disk-based storage, other types of storage, or any combination thereof. The computer-readable media 106 may be used to store modules, databases, and the like. The modules stored in the computer-readable media 106 may include instructions that are executable by the processors 104 to perform the various functions provided by the server 102, as described herein.

As illustrated in FIG. 1, the computer-readable media 106 includes a duplicate content detection module 108, a content extraction module 110, an N-gram selection module 112, a hashing module 114, a hash code repository 116, a digital item review module 118, a recommendation module 120, a catalog search module 122, and a digital item store 124. Of course, the computer-readable media 106 may also include other software modules, as well as device drivers, an operating system, and other application software.

In operation, an individual may use a submitter device 126 to submit a digital item 128, such as an electronic book ("eBook"), to a digital item submission service 130. The digital item 128 may include various components, such as digital content and associated metadata 132 (e.g., title, description, and the like). The digital content may include one or more of text-based content, images, figures, audio, video, other content or any combination thereof. The digital item submissions service 130 may submit the digital item 128 to the server 102 for publishing. The digital item 128 may also be referred to as the submitted digital item 128.

In response to receiving the digital item 128, the server 102 may assign a digital item identifier 134 to the digital item 128. The server 102 may store the digital item 128 and the digital item identifier 134 in the digital item store 124. The server 102 may determine whether the submitted digital item 128 includes duplicate content and whether the submitted digital item 128 is suitable for publication.

The server 102 may cause one or more automated analysis processes to be performed on the digital content and/or metadata that is associated with the digital item 128. These automated analysis processes may be performed by one or more of the modules 108, 110, 112, or 114. In some implementations, at least two of the modules 108, 110, 112, or 114 may operate in substantially contemporaneously (e.g., substantially simultaneously). For example, the N-gram selection module 112 may select an N-gram (e.g., a set of words) from the digital item 128 and the hashing module 114 may compute a hash code based on the selected N-gram. Substantially at the same time that the hashing module 114 is computing the hash code of the selected N-gram, the N-gram selection module 112 may select a next N-gram in the digital item 128.

The duplicate content detection module 108 may determine whether the digital item 128 includes duplicate content. The duplicate content detection module 108 may instruct the content extraction module 110 to convert the content of the digital item 128 to a standardized format. For example, the content extraction module 110 may remove stop words (e.g., words that are not semantically meaningful), remove markup and formatting, and convert the content of the digital item 128 to a uniform case (e.g., lowercase or uppercase). The N-gram selection module 112 may select N-grams from the digital item 128. In some cases, the selected N-grams may overlap, such that an N-gram and a subsequent N-gram have at least one common word. The hashing module 114 may determine hash codes of the selected N-grams using a hashing algorithm that has a substantially uniform distribution. For example, the hashing algorithm may be based on a Java® hashing algorithm, a Message Digest (MD5) algorithm, or another type of hashing algorithm.

The duplicate content detection module 108 may determine whether the submitted digital item 128 includes duplicate content by comparing the computed hash codes with retained hash codes that are stored in the cache repository 116. If more than a certain percentage of the computed hash codes associated with the digital item 128 match hash codes stored in the hash code repository 116, the recommendation module 120 may determine whether or not to recommend publishing the digital item 128. The recommendation module 120 may also determine whether or not the digital item 128 should be flagged for manual review. If the recommendation module 120 flags the digital item 128 for manual review, a human reviewer may use an interface provided by the digital item review module 118 to review the digital item 128. The digital item review module 118 may provide information associated with the digital item 128, such as an author of the digital item 128, how much duplicate content is included in the digital item 128, and the like, to enable the human reviewer to determine whether or not to publish the digital item 128. To expedite the manual review, the digital item review module 118 may provide a user interface that enables the human reviewer to view the N-grams associated with the matching hash codes or to view the portion of content associated with the matching hash codes.

If the recommendation module 120 and/or the human reviewer recommend that digital item 128 for publication, the duplicate content detection module 108 may select a subset of hash codes from the computed hash codes for retention in the hash code repository 116. For example, the duplicate content detection module 108 may select a subset of hash codes from the computed hash codes based on a mathematical property associated with the computed hash codes, such as whether the computed hash codes are divisible by a particular number (e.g., such as $2^M$ where M>0). The subset of hash codes may be stored in the hash code repository in such a way that the digital item 128 is associated with the subset of hash codes. The subset of hash codes that are associated with the digital item 128 and stored in the hash code repository 116 may be referred to as a digital fingerprint of the digital item 128.

A publishing service 136 may receive the digital item 128 from the recommendation module 120 and make the digital item 128 available for acquisition (e.g., purchase, rental, and the like) by placing the digital item 128 in a catalog 138. The catalog search module 122 may enable users to perform a search of the catalog 138. For example, in response to a user request, the catalog search module 122 may perform a search on the catalog 138 and provide search results that include a title of the digital item 128.

In some implementations, the recommendation module 120 may communicate directly with the publishing service 136 to automatically (e.g., without human interaction) publish a digital item, such as the digital item 128. If the recommendation module 120 flags the digital item 128 for human review, the human reviewer may determine whether to publish the digital item 128.

The digital item review module 118 may retrieve a list of un-reviewed digital items from the digital item store 124. The digital item review module 112 may include various user interface elements that enable a review device 140 to retrieve a list of un-reviewed digital items. The various user interface elements may enable a reviewer operating the review device 140 to assign unassigned digital items for review, accept or select digital items for review, and to review the digital items. The user interfaces may be displayed on a display of the review device 140. In some embodiments, the user interface elements may include web pages, such as web pages built with hypertext markup language (HTML) data and/or other components, for viewing with a web browser. The user interfaces may include selectable options for making publication decisions regarding the digital item, including rejecting, flagging as accepted with modification, or accepting for publication, or other. The user interface elements may include aspects of the digital item (e.g., at least a portion of the content of the digital item 128 or at least a portion of the metadata 132) and other information associated with the digital item.

Thus, the server 102 may include various software modules to automatically (e.g., without human interaction) determine whether digital items include duplicate content. One or more of the modules may automatically identify which of the digital items submitted for publication are suitable for publication and which are unsuitable for publication. If a digital item is identified as unsuitable for publication, the one or more modules may automatically (1) notify the submitter device that the digital item is unsuitable for publication or (2) flag the digital item for manual review. The modules may determine to notify the submitter device or flag the digital item based on whether the forward scores and reverse scores satisfy various thresholds. In some cases, the modules may automatically highlight (e.g., draw attention to) portions of the content of the digital item that caused the digital item to be flagged as unsuitable for publication to enable a reviewer to quickly perform the manual review. For example, a user interface provided to a human reviewer may enable the reviewer to view the portions of the digital item and the matching portions of the other items in a single window. In this way, a publisher may automate most of the tasks associated with determining whether submitted digital items are suitable for publication and reduce how much time human reviewers spend determining whether submitted digital items are suitable for publication.

Although the functions of the architecture 100 are described using documents, the architecture 100 may be adapted to determine whether other types of digital items, such as digital items that include image files, audio files, video files, and the like, include duplicate content. For example, the server 102 may classify audio books that are submitted for publication by determining whether the audio books include duplicate content by computing hash codes over N feature values, where each feature value is extracted from the audio content of the audio book. As another example, when a video item is submitted, the server 102 may compute hash codes for N-grams (e.g., sets of) video frames to identify duplicate content. As yet another example, when a digital item that includes images is submitted, the server 102 may determine whether one or more of the images are copied from additional digital items. To illustrate, when an eBook that includes text and images is submitted for publication, the server 102 may determine whether the text includes duplicate content and whether the images include duplicate content. In some cases, the server 102 may determine whether the text includes duplicate content substantially contemporaneously (e.g., substantially in parallel) with determining whether the images include duplicate content.

The computer-readable media 106 may include storage media, such as volatile memory, nonvolatile memory, removable memory, and/or non-removable memory, implemented in any method or technology for storage of information, such as computer-readable instructions, data structures, program modules, or other data. Also, the processor(s) 104 may include onboard memory in addition to or instead of the computer-readable media 106. Examples of storage media that may be included in the computer-readable media 106 and/or processor(s) 104 include, but are not limited to, non-transitory media, such as random access memory (RAM), read only memory (ROM), electrically erasable programmable read only memory (EEPROM), flash memory or other memory technology, compact disk (CD-ROM), digital versatile disks (DVD) or other optical storage, magnetic tape, magnetic disk storage or other magnetic storage devices, or any other medium which can be used to store the desired information and which can be accessed by the processor(s) 104. Any such computer-readable storage media may be part of the architecture 100. The computer-readable media 106 may include software programs or other executable modules that may be executed by the processor(s) 104. The computer-readable media 106 may also be used to store the digital item store 124.

Various processes, instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processor(s) 104, as hardware, and/or as firmware. Typically, the functionality of the program modules may be combined or distributed as desired in various embodiments. An implementation of these modules and techniques may be stored on or transmitted across some form of computer-readable media.

The modules stored in the computer-readable media 106 may be implemented across one or more servers in a cloud computing environment, on a local device, or on a combination of both. The following discussion does not limit the implementation of the modules stored in computer-readable media 106 to any particular device or environment.

FIG. 2 is an illustrative architecture 200 that includes selecting N-grams according to some implementations. For example, the N-gram selection module 112 of FIG. 1 may select the N-grams illustrated in FIG. 2. The architecture 200 includes a first item 202 and a second item 204. For example, the first item 202 may be a previously submitted item and the second item 204 may be a recently submitted item.

The content extraction module 110 of FIG. 1 may convert the content of the first item 202 and the second item 204 to a standardized format. For example, the content extraction module 110 may convert the content of the first item 202 to a standardized format by performing various tasks, such as removing stop words 206 from the first item 202, converting the content of the first item 202 to a uniform case (e.g., upper case or lower case), removing formatting (e.g., bold, italics, and the like), removing markups, and the like. The content extraction module 110 may convert the content of the second item 204 to a standardized format by performing various tasks, such as removing stop words 208 from the second item 204, converting the content of the second item 204 to a uniform case (e.g., upper case or lower case), removing formatting (e.g., bold, italics, and the like), removing markups, and the like. The remaining operations, such as selecting N-grams, are performed on the content of items 202 or 204 in the standardized format, e.g., with the formatting, markup, stop words, and the like removed.

The N-gram selection module 112 may select N-grams (e.g., sets of words) starting with a first word of the content of the first item 202. For example, as illustrated in FIG. 2, the N-gram selection module 112 may select a first N-gram 210, a second N-gram 212, a third N-gram 214, and a fourth N-gram 216, until each word of the first item 202 is included in at least one N-gram. In this example, N=3 and so the N-gram selection module 112 may select sets of three consecutive (e.g., contiguous) words. Thus, the N-gram selection module 112 may select overlapping N-grams that include N consecutive words from the first item 202 until each word of the first item 202 is included in at least one N-gram. As illustrated in FIG. 2, each N-gram has an overlap of N−1 (e.g., in this example N−1=2) words relative to a previous N-gram or a subsequent N-gram. Of course, in other implementations, the N-grams may have a different size of overlap. The N-gram selection module 112 may similarly select a fifth N-gram 218, a sixth N-gram 220, seventh N-gram 222, and an eighth N-gram 224, until each word of the second item 204 is included in at least one N-gram. In the illustrated example, the first N-gram 210 is the same as the eighth N-gram 224.

Thus, when the digital item is submitted for publication, the content of the digital item may be converted to a standardized format and N-grams may be selected from the standardized format content of the digital item. While N-grams of three words are illustrated in FIG. 2, N may typically be an integer between six and twenty. In some cases, a smaller N, such as six, may be used for smaller books (e.g., children's books and the like that have relatively few words) while a larger N, such as ten or twelve, may be used for larger books (e.g., books with more words). The N-grams may be used to compute hash codes, as described in FIG. 3.

Figure 3:
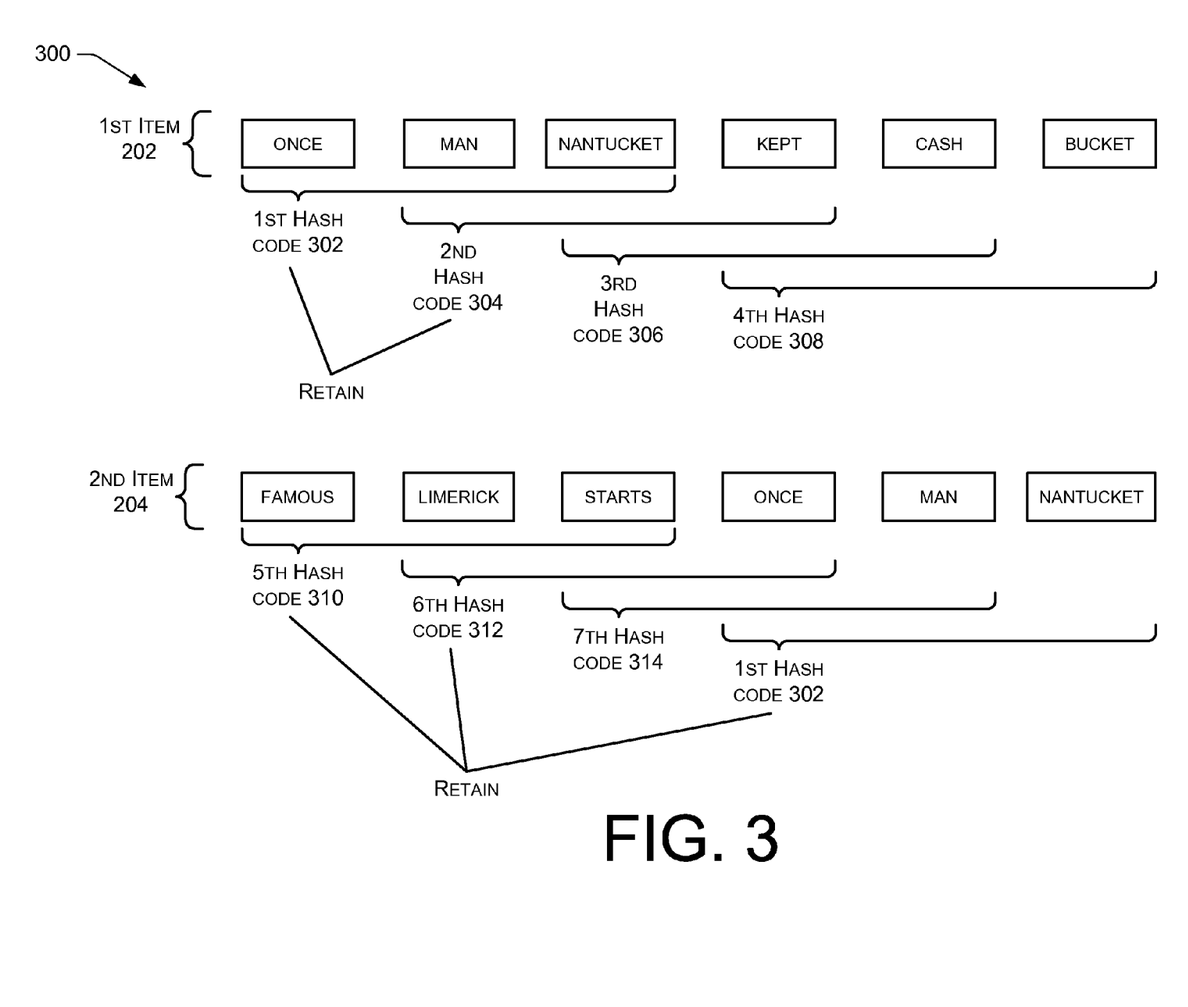
FIG. 3 is an illustrative architecture that includes computing hash codes according to some implementations.

FIG. 3 is an illustrative architecture that includes computing hash codes according to some implementations. For example, the hashing module 114 of FIG. 1 may be used to compute hash codes of N-grams, such as one or more of the N-grams 210, 212, 214, 216, 218, 220, 222, or 224 of FIG. 2. The hashing module 114 may use a hashing algorithm such as a Java®-based hashing algorithm, a message digest (MD5) algorithm, or another type of hashing algorithm that provides substantially uniformly distributed hash codes.

For the first item 202, the hashing module 114 may compute a first hash code 302 based on the first N-gram 210, a second hash code 304 based on the second N-gram 212, a third hash code 306 based on the third N-gram 214, and a fourth hash code 308 based on the fourth N-gram 216. For the second item 204, the hashing module 114 may compute a fifth hash code 310 based on the fifth N-gram 210, a sixth hash code 312 based on the sixth N-gram 220, and a seventh hash code 314 based on the seventh N-gram 222. The hashing module 114 may compute the first hash code 302 based on based on the eighth N-gram 224 because the first N-gram 210 and the eighth N-gram 224 both include the same words.

In this example, comparing the hash codes computed for the first item 202 with the hash codes computed for the second item 204 indicates that the second item 204 includes one portion of duplicate content. To illustrate, the first item 202 may include a selection of famous limericks while the second item 204 may be a book submitted for publication that analyzes famous limericks. Because the first item 202 and the second item 204 and only have one hash code that matches, indicating duplicate content, the second item 204 may be flagged for human review. The human reviewer may determine that the second item 204 is suitable for publication because the second item 204 analyzes famous limericks. In other words, the human reviewer may determine that the duplicate content is acceptable in this particular case (e.g., insufficient to prevent publication).

A subset of the hash codes computed for the first item 202 or the second item 204 may be retained. The retained hash codes may be used as a digital fingerprint of the first item 202 or the second item 204. For example, first hash code 302 and the second hash code 304 may be retained and associated with the first item 202. The fifth hash code 310, the sixth hash code 312 and the first hash code 302 may be retained and associated with the second item 204. When a new item is submitted for publication, hash codes may be computed for the submitted digital item and compared with the retained hash codes of additional digital items to determine whether the submitted digital item includes duplicate content.

Figure 4:
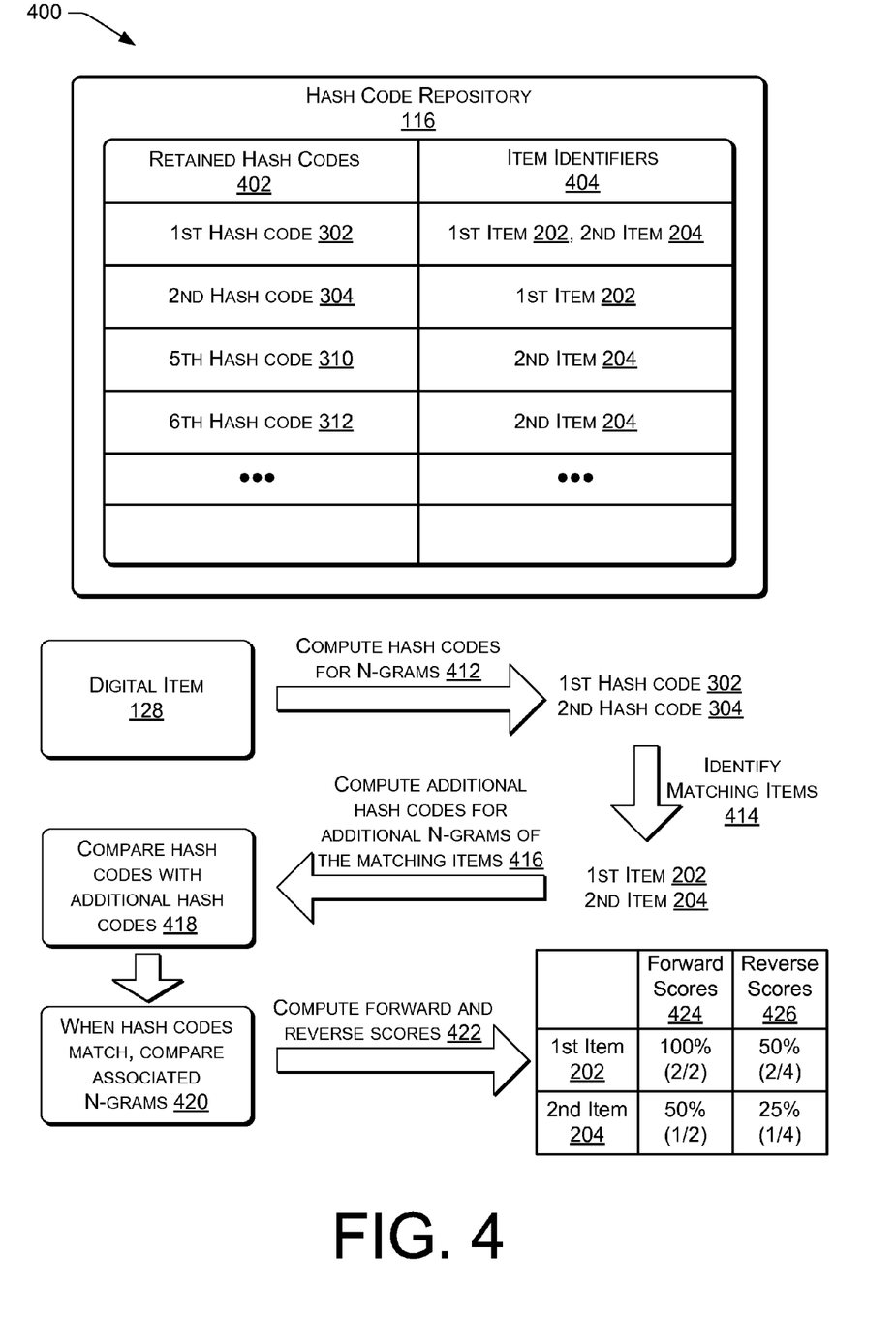
FIG. 4 is an illustrative architecture that includes a hash code repository according to some implementations.

FIG. 4 is an illustrative architecture 400 that includes a hash code repository according to some implementations. Retained hash codes may be stored in a hash code repository, such as the hash code repository 116. The hash code repository 116 may associate retained hash codes 402 with digital items 404 using item identifiers 404 associated with the digital items. While a table is used as an example of a data structure that associates retained hash codes with digital items in the architecture 400, other types of data structures may be used to associate retained hash codes with digital items. For example, a linked list data structure may be used to associate retained hash codes with digital items. To illustrate, when a digital item and the associated hash codes are added to the hash code repository 116, an identifier of the digital item may be added to the linked list of each of the retained hash codes associated with the digital item. In some implementations, the hash code repository 116 may be stored remotely from the server 102, such as in a network-accessible storage (e.g., cloud-based storage) that is accessed at speeds approaching random access memory. For example, the network-based storage may use solid-state storage devices rather than disk-based storage devices. Such an implementation may enable the server 102 to be unconstrained by an amount of random access memory that is physically available to the server 102. In such an implementation, instead of using a linked list to store the hash code repository 116, each hash code/item pair may be stored in a separate record of the hash code repository. Thus, instead of storing hash code 302→list of (item 202, item 204), the server 102 may independently store the pairs (hash code 302, item 202) and (hash code 302, item 204) in the hash code repository 116. In such an implementation, the list of items associated with each hash code may not be updated, thereby avoiding any potential of concurrent contention some form of locking. Instead, a (hash code, item identifier) pair may be written or removed from the hash code repository while leaving other pairs (hash code, item identifier) unaffected. The network-based storage implementation may support efficient retrieval of records by the first key (e.g., the hash code) or access of individual records using two keys (e.g., the hash code and the item identifier). In this implementation, the server 102 may perform idempotent writes without locking any records in the hash code repository 116.

In the architecture 400, the hash code repository 116 may include hash codes, such as the hash codes 302, 304, 310, and 312. Each retained hash code of the retained hash codes 402 may have a corresponding entry identifying digital items with a particular retained hash code. For example, for the first item 202, the first hash code 302 and the second hash code 304 may be retained from the hash codes 302, 304, 306, and 308 computed for the first item 202. Therefore, in the hash code repository 116, an identifier of the first item 202 may be associated with the first hash code 302 and the second hash code 304. For the second item 204, the first hash code 302, the fifth hash code 310, and the sixth hash code 312 may be retained from the hash codes 302, 304, 306, and 308 computed for the second item 204. Therefore, in the hash code repository 116, an identifier of the first item 202 may be associated with the first hash code 302, the fifth hash code 310, and the sixth hash code 312.

When the digital item 128 is submitted for publication to the server 102, the server 102 may, at 412, compute hash codes for N-grams of the submitted digital item 128. For example, in FIG. 4, the first hash code 302 and the second hash code 304 may be computed for N-grams of the submitted digital item 128. To simplify the example, assume that the hash codes 302 and 304, are the total number of hash codes for the digital item 128 and that both of the hash codes 302 and 304 have a particular mathematical property that causes them to be retained. The server 102 may, at 414, identify matching items, e.g. determine which other items in the hash code repository have hash codes that match the computed hash codes associated with the digital item 128. In FIG. 4, the server 102 may identify the first item 202 and the second item 204 as having matching hash codes (e.g., the first hash code 302 and the second hash code 304).

To verify that the submitted digital item 128 includes duplicate content, the server 102 may, at 416, compute additional hash codes for N-grams of each of the matching digital items. At 418, the server 102 may compare the additional hash codes with the computed hash codes associated with the submitted digital item 128. Thus, the server 102 may compare the additional hash codes calculated for each of the additional digital items, rather than just the retained hash codes. In this example, the server 102 may compare the hash codes 302 and 304 computed for the submitted digital item 128 with the hash codes 302, 304, 306, and 308 of the first item 202 and the hash codes 302, 310, 312, and 314 of the second item 204.

When a hash code of one of the additional digital items (e.g., the digital items 202 and 204) matches a hash code of the submitted digital item (e.g., the hash codes 302 and 304), the automated system may, at 420, compare the underlying N-grams used to calculate the hash codes to determine whether the content was copied or whether the matching hash codes were a false positive. In this example, the server 102 may compare the first N-gram 210 ("once man nantucket") and the second N-gram 212 ("man nantucket kept") of the first item 202 with N-grams from the submitted digital item 128 that correspond to the hash codes 302 and 304. The server 102 may compare the fifth N-gram 218 ("famous limerick starts"), the sixth N-gram 220 ("limerick starts once"), and the eighth N-gram 224 ("once man nantucket") of the second item 204 with N-grams from the submitted digital item 128 that correspond to the hash codes 302 and 304.

In some implementations, the server 102 may, at 422, calculate forward and reverse scores. A forward score identifies how much content of the submitted digital item is included in a particular digital item and may be calculated by dividing the total number of hash codes in the submitted digital item that match hash codes associated with the particular digital item by the total number of hash codes calculated for the particular digital item. In this example, the hash codes 302 and 304 match when comparing the hash codes of the submitted digital item 128 with hash codes of the first item 202 (e.g., both of the hash codes of the submitted digital item 128 are a match). Thus, the forward score with reference to the first item 202 is 2/2=100% duplicate content. The second hash code 304 matches when comparing the hash codes of the submitted digital item 128 with hash codes of the second item 204 (e.g., one of the two hash codes of the submitted digital item 128 are a match). Thus, the forward score with reference to the second item 204 is 1/2=50% duplicate content.

A reverse score identifies how much content of a particular digital item is included in the submitted digital item and may be calculated by dividing the total number of hash codes in the particular digital item that match hash codes associated with the submitted digital item by the total number of hash codes calculated for the particular digital item. In this example, the hash codes 302 and 304 match when comparing the hash codes of the submitted digital item 128 with hash codes of the first item 202 (e.g., two of the four hash codes of the first digital item 202 are a match). Thus, the reverse score with reference to the first item 202 is 2/4=50% duplicate content. The hash code 302 matches when comparing the hash codes of the submitted digital item 128 with hash codes of the second item 204 (e.g., one of the two hash codes of the second digital item 204 are a match). Thus, the reverse score with reference to the second item 204 is 31/2=25% duplicate content. In this example, based on the forward scores 424 and the reverse scores 426, the server 102 may automatically determine that the submitted digital item 128 is unsuitable for publication.

Thus, if the server 102 determines that the submitted digital item 128 includes duplicate content, the server 102 may perform an additional analysis to verify the duplicate content and/or rule out false positives. For example, the server 102 may identify the retained hash codes that match the computed hash codes of the submitted digital item and identify additional digital items that correspond to the matching retained hash codes. The automated system may calculate additional hash codes for N-grams of each of the other digital items and compare the additional hash codes with the computed hash codes associated with the submitted digital item. When a hash code of one of the other digital items matches a hash code of the submitted digital item, the automated system may compare the underlying N-grams to verify whether the submitted digital item includes duplicate content.

The server 102 may also calculate forward and reverse scores to identify how much content of the submitted digital item is included in a particular digital item and how much content of the particular digital item is included in the submitted digital item. When the server 102 identifies duplicate content and verifies that the content was copied from one or more other digital items, based on the forward and reverse scores, the server 102 may automatically (1) flag the item for manual review or (2) send a message to a submitter of the digital item indicating that the digital item is unsuitable for publication or flag the digital item for human review.

Figure 5:
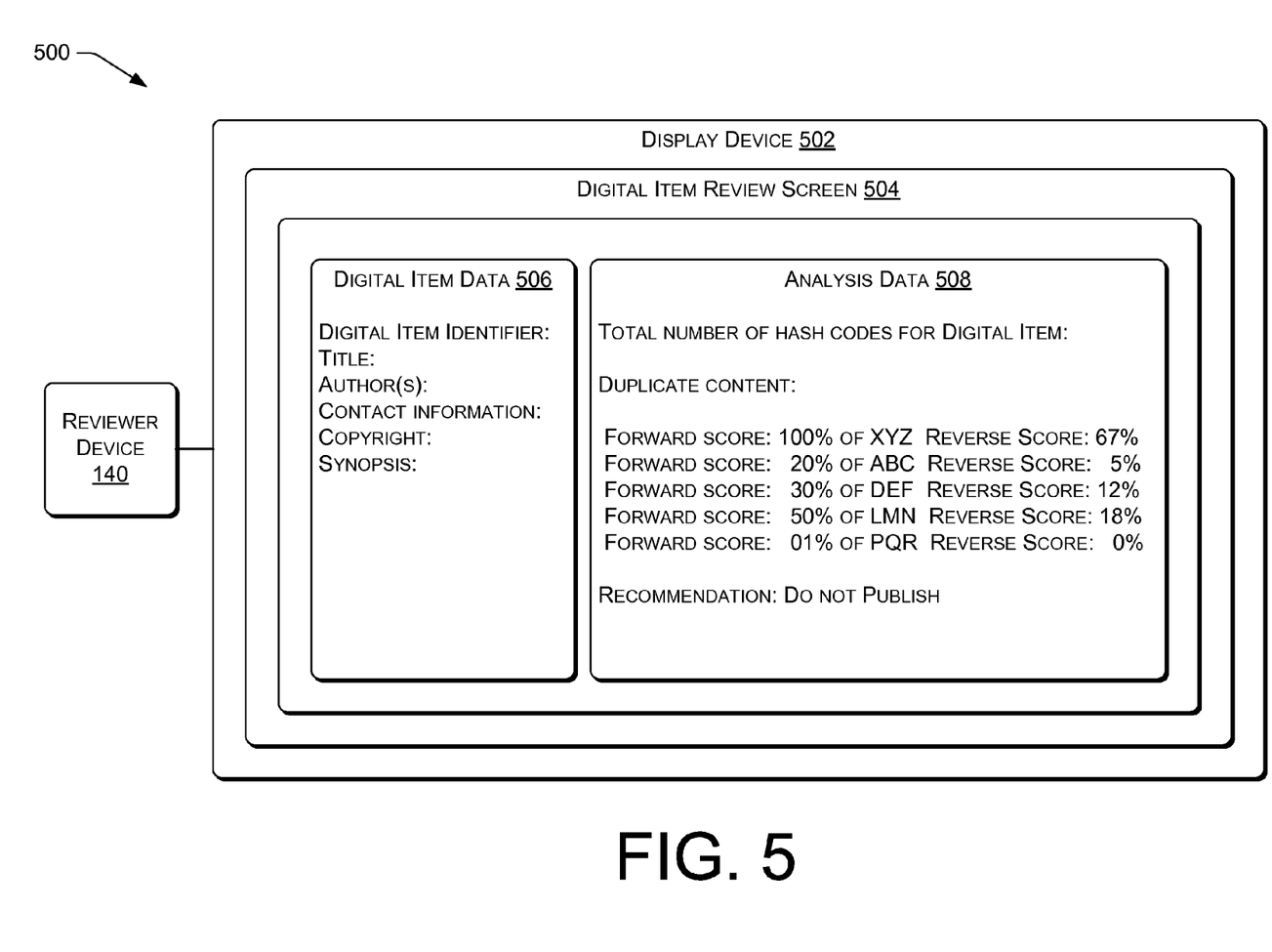
FIG. 5 is an illustrative architecture that includes an interactive user interface according to some implementations.

FIG. 5 is an illustrative architecture 500 that includes an interactive user interface according to some implementations. The architecture 500 includes a display device 502. The display device 502 may be communicatively coupled to the reviewer device 140. The display device 502 may display a digital item review screen 504. The digital item review screen 504 may be provided by the digital item review module 118 of FIG. 1. The digital item review screen 504 may display various types of data associated with a submitted digital item, such as digital item data 506 and analysis data 508.

The digital item data 506 may include data associated with the submitted digital item, such as an identifier associated with the digital item, a title associated with the digital item, one or more authors associated with the digital item, contact information associated with an individual that submitted the digital item, a copyright associated with the digital item, a synopsis associated with the digital item, other data associated with the digital item, or any combination thereof. The analysis data 508 may include information that the server 102 has obtained based on analyzing the digital item, such as a total number of hash codes for the digital item, a percentage of the digital item that is copied (e.g., expressed in terms of forward and reverse scores derived from matching retained hash codes in the repository), other analysis data, or any combination thereof. The analysis data 508 may also include a recommendation determined by the server 102.

Thus, the digital item screen 504 may enable a reviewer to view the analysis data 508 associated with the digital item to determine whether or not the digital item is suitable for publication. The digital item review screen 504 may enable the reviewer to send a notification to an individual who submitted the digital item. The notification may indicate whether the digital item is suitable or unsuitable for publication.

Example Processes

Figure 6:
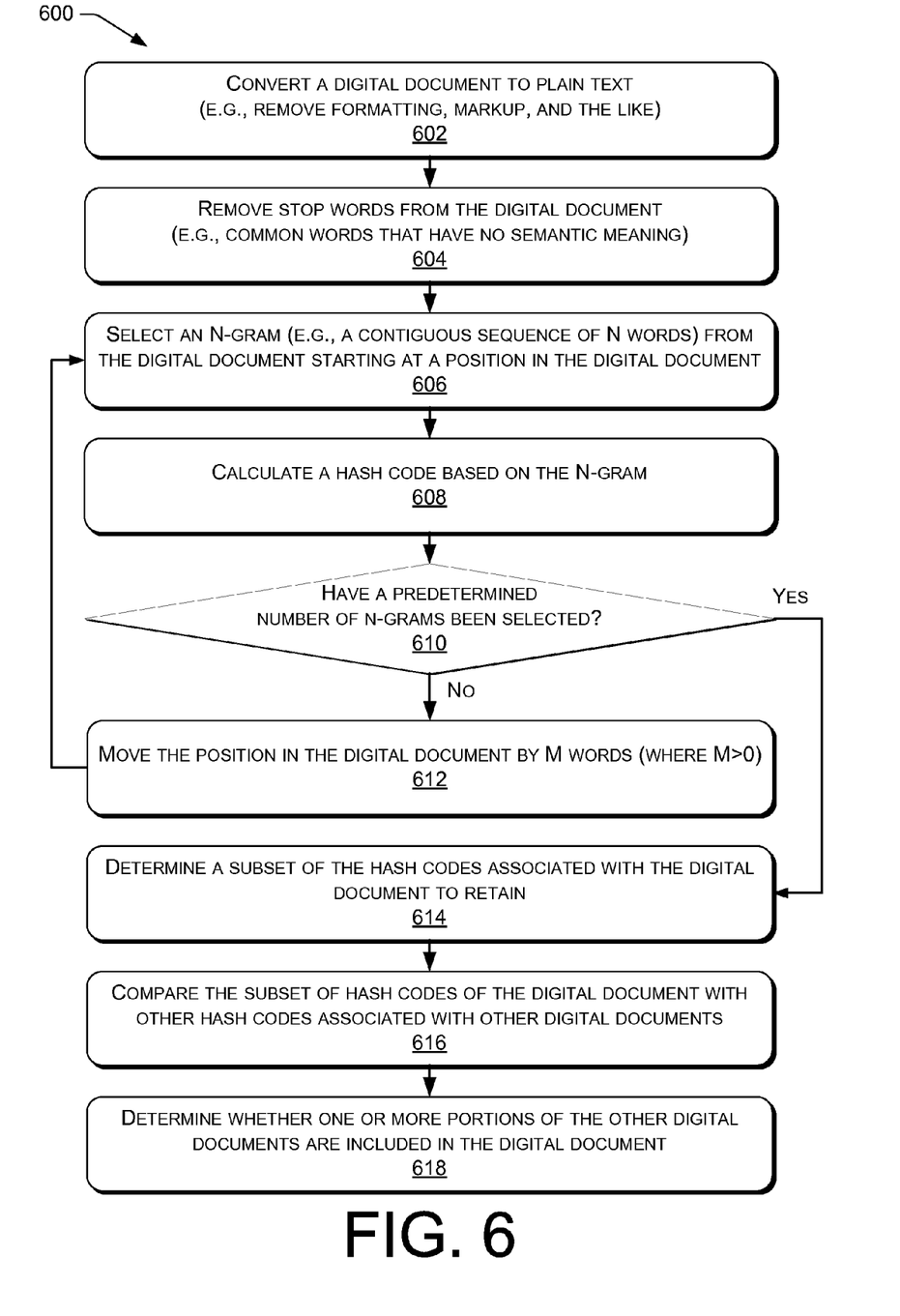
FIG. 6 is a flow diagram of an example process to determine which hash codes associated with a digital document to retain according to some implementations.
Figure 7:
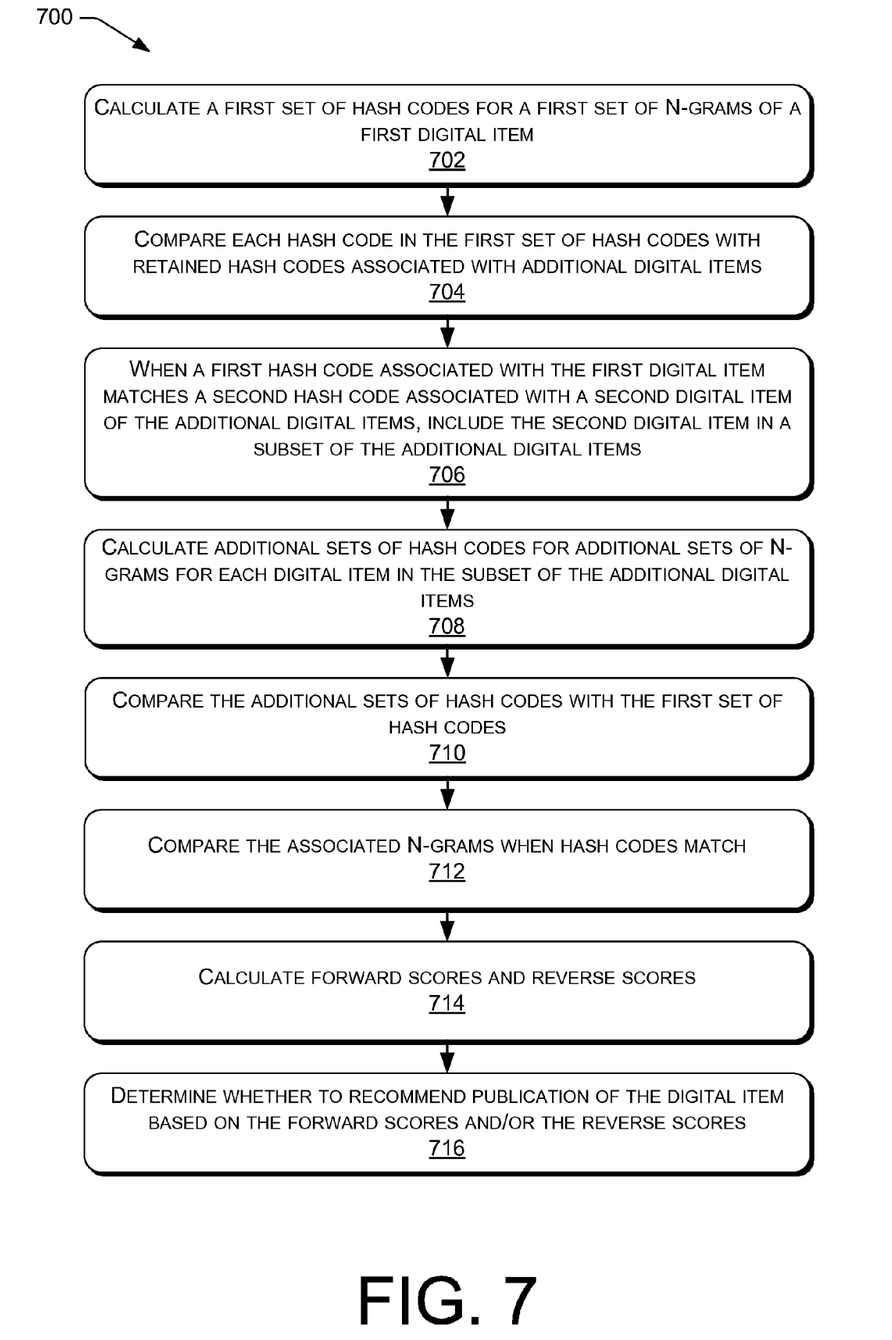
FIG. 7 is a flow diagram of an example process that includes calculating forward scores and reverse scores according to some implementations.

In the flow diagrams of FIGS. 6 and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 600 and 700 are described with reference to the architectures 100, 200, 300, 400, and 500 as described above, although other models, frameworks, systems and environments may implement these processes.

FIG. 6 is a flow diagram of an example process 600 to determine which hash codes associated with a digital document to retain according to some implementations. The process 600 may be performed by one or more of the modules of the server 102 of FIG. 1. The process 600 is described with reference to a digital item that includes a digital document (e.g., an eBook). However, it should be understood that other types of digital items, such as video items, audio items, or images, may be processed in a similar manner.

At 602, a digital document may be converted to plain text. For example, in FIG. 1, the content extraction module 110 may convert the digital item 128 to a standardized format by removing formatting, markup and the like.

At 604, stop words may be removed from or ignored in the digital document. For example, in FIG. 1, the content extraction module 110 may remove stop words from the digital item 128. For other types of content, the content extraction module 110 may convert the other types of content to a standardized format. For example, audio items may be converted to a standardized sampling rate. As another example, images may be converted to a standard image format, such as JPEG.

At 606, an N-gram may be selected from the digital document starting at a position in the digital document. For example, in FIG. 1, the N-gram selection module may select an N-gram starting at a particular position (e.g., the first word) in the digital item 128. For other types of content, the N-gram selection module may select appropriate N-grams. For example, when the submitted digital item includes video content, the N-gram selection module may select N consecutive video frames. As another example, when the submitted digital item includes audio content, the N-gram selection module may select N consecutive seconds of audio.

At 608, a hash code may be calculated based on the N-gram. For example, the hashing module 114 may calculate a hash code, such as the first hash code 302, based on the first N-gram 210.

At 610, a determination may be made as to whether a predetermined number of n-grams have been selected. Thus, in some cases, a predetermined number of N-grams may be selected. For example, N-grams may be selected from a portion of each digital item. In other cases, a determination may be made whether each word in the digital document is included in at least one N-gram. For example, in FIG. 1, the N-gram selection module 112 may indicate that each word in the digital item 128 is included in at least one N-gram when the position reaches the last word in the digital item 128. Of course, in other implementations, another constraint may be used to determine when to stop selecting N-grams from the submitted digital item.

If a determination is made, at 610, that the predetermined number of N-grams have been selected, then the position in the digital document may be moved by M words (where M>0), at 612, and the process proceeds to 606, where an N-gram may be selected starting at the position. For example, in FIG. 2, the N-gram selection module 112 may select the first N-gram 210 starting at a position corresponding to the first word of the first item 202. After selecting the first N-gram 210, the N-gram selection module 112 may determine that a predetermined number of N-grams have not been selected (or that not every word in the first item 202 is included in at least one N-gram). The N-gram selection module 112 may move the position in the first item 202 by one word to the second word and select the second N-gram 212.

If a determination is made, at 610, that the predetermined number of n-grams have been selected (or that each word in the digital document is included in at least one N-gram), then the process may proceed to 614, where a determination is made as to retaining a subset of the hash codes associated with the digital document. For example, a subset of the hash codes associated with the digital document may be retained based on a mathematical property associated with the hash codes, such as whether the hash codes are divisible by a particular power of 2. For example, in FIG. 3, after selecting the fourth N-gram 216, the N-gram selection module 112 may determine that the predetermined number of N-grams have been selected (or that every word in the first item 202 is included in at least one N-gram) and notify the duplicate content detection module 108. In response, the duplicate content detection module 108 may determine to retain the first has code 302 and the second hash code 304 associated with the first item 202.

The duplicate content detection module 108 may determine to retain the fifth hash code 310, the sixth hash code 312, and the first hash code 302 associated with the second item 204. If a determination is made to publish the submitted digital item, the subset of hash codes may be associated with the submitted digital item and stored in the hash code repository 116.

At 616, the subset of hash codes of the digital document may be compared with other hash codes associated with other digital documents. For example, at 414 in FIG. 4, the duplicate content detection module 108 may compare a subset of the hash codes of the submitted digital item 128 with retained hash codes 402 of other digital items to identify the matching items in the hash code repository 116.

At 618, a determination is made whether one or more portions of the other digital documents are included in the digital document. For example, if any of the subset of hash codes of the submitted digital item 128 match retained hash codes 402 of other digital items, then the duplicate content detection module 108 may determine that one or more portions of the other digital documents are included in the submitted digital item 128. Thus, if any of the subset of hash codes of the submitted digital item 128 match retained hash codes 402 of other digital items, then the duplicate content detection module 108 may determine that the submitted digital item 128 includes duplicate content. In some cases, the recommendation module 120 may automatically determine whether the submitted digital item 128 is suitable for publication when the amount of duplicate content is below a first threshold. If the submitted digital item 128 is determined to be suitable for publication, the server 102 may send the submitted digital item 128 to the publishing service 136 for publication. If the submitted digital item 128 is determined to be unsuitable for publication because the amount of duplicate content is above a second threshold, the server 102 may (1) flag the submitted digital item 128 for manual review and send the submitted digital item 128 to the digital item review module 118 or (2) send the submission device 126 a notification indicating that the submitted digital item 128 is unsuitable for publication. The determination whether to flag the submitted digital item 128 or send a notification may be made based on how much duplicate content is determined to be included in the digital item 128 based on the matching hash codes.

Thus, when a digital item is submitted for publication, hash codes may be computed for N-grams of N contiguous words selected from the submitted digital item. The computed hash codes of the submitted digital item may be compared with retained hash codes associated with other digital items to determine whether any of the computed hash codes match the retained hash codes. Based on how many of the computed hash codes match the retained hash codes, a determination is made whether the submitted digital item includes duplicate content and whether the submitted digital item is suitable for publication.

FIG. 7 is a flow diagram of an example process 700 that includes calculating forward scores and reverse scores according to some implementations. The process 700 may be performed by one or more of the modules of the server 102 of FIG. 1. The process 700 illustrates reducing false positives by verifying whether the submitted digital item includes duplicate content when the computed hash codes associated with the submitted digital item match other hash codes associated with other digital items.

At 702, a first set of hash codes for a first set of N-grams of a first digital item are calculated. For example, in FIG. 4, the hash codes 302, 304, and 310 may be calculated for the digital item 128, at 412.

At 704, each hash code in the first set of hash codes is compared with retained hash codes associated with additional digital items. For example, in FIG. 4, the hash codes 302, 304, and 310 may be compared with the retained hash codes 402 from the hash code repository 116.

At 706, when a first hash code associated with the first digital item matches a second hash code associated with a second digital item of the additional digital items, the second digital item is included in a subset of the additional digital items. The subset of the additional digital items may include particular digital items whose hash codes match the computed hash codes of the digital item 128. For example, in FIG. 4, the first hash code 302 may be identified as being associated with the first item 202. The first item 202 may be included in a subset of the digital items in the hash repository 116, e.g., the subset of digital items that has hash codes that match the computed hash codes of the submitted digital item 128.

At 708, additional sets of hash codes for additional sets of N-grams for each digital item in the subset of the additional digital items may be calculated. For example, in FIG. 4, additional hash codes for additional N-grams of the first item 202 and the second item 204 may be calculated, at 416. Thus, after identifying items that match the first set of hash codes associated with the first digital item, a more detailed comparison may be performed between the first digital item (e.g., the submitted digital item) and the subset of additional digital items (e.g., the matching digital items). Because a subset of the additional digital items is being used, a more detailed comparison may be made between the submitted digital item and the matching digital items. For example, 708, 710, and 712 describe computing and comparing additional hash codes (e.g., more than the retained hash codes) of the submitted digital item and the matching digital items and comparing the underlying N-grams when there is a match. In some cases, all of the hash codes may be computed and compared for the submitted digital item and for the matching digital items.

At 710, the additional sets of hash codes may be compared with the first set of hash codes. For example, in FIG. 4, the hash codes of the submitted digital item 128 may be compared with additional hash codes computed for additional N-grams of the matching items (e.g., the items 202 and 204), at 418.

At 712, the corresponding N-grams may be compared when hash codes match. For example, in FIG. 4, when the server 102 determines that the first hash code 302 of the digital item 128 matches the first hash code 302 associated with the first item 202, the server 102 may compare the N-gram used to calculate the first hash code 302 of the digital item 128 with the first N-gram 210 of the first item 202.

At 714, forward scores and reverse scores may be calculated. For example, in FIG. 4, the forward scores 424 and reverse scores 426 may be calculated, at 422.

At 716, a determination may be made whether to recommend publication of the digital item based on the forward scores, the reverse scores, or both. For example, in FIG. 4, the server 102 may determine whether to recommend that the digital item 128 is suitable for publication based on the forward scores 424 and the reverse scores 426 because the scores 424 and 426 identify an extent of the duplicate content in the digital item 128.

Thus, when a digital item is submitted for publication, when computed hash codes of the submitted digital item match retained hash codes, the additional digital items associated with the matching retained hash codes may be identified. Hash codes for each N-gram of the additional digital items may be calculated and compared with the computed hash codes of the submitted digital item. If two hash codes match when comparing the hash codes, the associated N-grams of the hash codes may be compared to verify whether the underlying content is duplicate content. In this way, false positives may be reduced or eliminated. Thus, an automated system, such as the server 102, may automatically determine whether the submitted digital item is suitable for publication. The automated system may automatically flag the submitted digital item for manual review in some cases. For example, the automated system may determine whether the submitted digital item is suitable for publication or should be manually reviewed based on the forward scores and the reverse scores.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. A method under control of one or more processors configured with specific instructions, the method comprising:
receiving a first electronic content item;
selecting a first plurality of sets of words from the first electronic content item;
computing a first plurality of hash codes, wherein each hash code of the first plurality of hash codes corresponds to a set of words of the first plurality of sets of words;
comparing the first plurality of hash codes with stored hash codes associated with other electronic content items;
selecting a second electronic content item of the other electronic content items;
determining a number of the first plurality of hash codes that match a hash code of a second plurality of hash codes corresponding to the second electronic content item;
determining a number of the second plurality of hash codes that match a hash code of the first plurality of hash codes;
determining a forward score that indicates an amount of the first electronic content item that is included in the second electronic content item using the number of the first plurality of hash codes of the first electronic content item that match at least one hash code of the second plurality of hash codes of the second electronic content item;
determining a reverse score that indicates an amount of the second electronic content item that is included in the first electronic content item using the number of the second plurality of hash codes that match at least one hash code of the first plurality of hash codes; and
determining whether the first electronic content item is suitable for publication based at least in part on the forward score and the reverse score.

2. The method of claim 1, wherein selecting the first plurality of sets of words includes:
identifying stop words included in the first electronic content item;
standardizing the first electronic content item by excluding the identified stop words from the first electronic content item to create standardized electronic content; and
generating a plurality of N-grams of the standardized electronic content, wherein each of the plurality of N-grams includes a predetermined number of consecutive words of the standardized electronic content.

3. The method of claim 2, wherein:
the plurality of N-grams include a first N-gram and a second N-gram, and
the first N-gram and the second N-gram overlap by at least one word.

4. The method of claim 1, wherein determining whether the first electronic content item is suitable for publication includes determining a correlation between the computed hash codes and the stored hash codes.

5. The method of claim 1, wherein determining whether the first electronic content item is suitable for publication includes determining whether a threshold percentage of the first plurality of hash codes match stored hash codes associated with the other electronic content items.

6. A computing device comprising:
one or more processors; and
a computer-readable storage media comprising instructions executable by the one or more processors to perform acts comprising:
receiving a first digital item that includes text;
selecting a first plurality of sets of words from the text;
computing a first plurality of hash codes, wherein each hash code of the first plurality of hash codes corresponds to a set of words of the first plurality of sets of words;
selecting a second digital item;
determining a number of the first plurality of hash codes that match a hash code of second plurality of hash codes corresponding to the second digital item;
determining a number of the second plurality of hash codes that match a hash code of the first plurality of hash codes;
determining an amount of duplicate content by:
determining a forward score that indicates an amount of the first digital item that is included in a second digital item using the number of the first plurality of hash codes of the first digital item that match at least one hash code of the second plurality of hash codes of the second digital item;
determining a reverse score that indicates an amount of the second digital item that is included in the first digital item using a total number of the second plurality of hash codes that match at least one hash code of the first plurality of hash codes; and
determining, based at least in part on the forward score and the reverse score, whether to provide the first digital item for acquisition at a merchant site.

7. The computing device of claim 6, wherein the first digital item comprises an electronic book (eBook).

8. The computing device of claim 6, wherein the acts further comprise:
in response to determining to provide the first digital item for acquisition at the merchant site, storing a subset of the first plurality of hash codes; and
associating the subset of the first plurality of hash codes with the first digital item.

9. The computing device of claim 8, further comprising:
storing the subset of the first plurality of hash codes in response to determining that each hash code of the subset has a mathematical property.

10. The computing device of claim 9, wherein determining that each hash code of the subset has the mathematical property comprises determining whether each hash code is a power of two.

11. The computing device of claim 6, wherein selecting the first plurality of sets of words from the text includes:
determining whether the text includes one or more stop words;
converting the text to a standardized format by removing the one or more stop words; and
selecting a plurality of N-grams from the standardized format, wherein each N-gram of the plurality of N-grams includes a predetermined number of consecutive words of the standardized format.

12. The computing device of claim 11, wherein:
the plurality of N-grams include a first N-gram and a second N-gram, and
the first N-gram and the second N-gram have at least one word in common.

13. One or more non-transitory computer-readable media comprising instructions executable by one or more processors to perform acts comprising:
receiving a first digital item comprising electronic content;
selecting a first plurality of sets of words from the first digital item;
computing a first plurality of hash codes, wherein each hash code of the first plurality of hash codes corresponds to a set of words in the first plurality of sets of words;
comparing the first plurality of hash codes with stored hash codes associated with additional digital items;
selecting a second digital item of the additional digital items;
determining a number of the first plurality of hash codes that match at least one hash code of a second plurality of hash codes corresponding to the second digital item;
determining a number of the second plurality of hash codes that match at least one hash code of the first plurality of hash codes;
determining an amount of duplicate content in the first digital item by determining:
a reverse score that indicates an amount of the second digital item that is included in the first digital item using the number of the second plurality of hash codes of the second digital item that match the at least one hash code of the first plurality of hash codes, and
a forward score that indicates an amount of the first digital item that is included in the second digital item using the number of the first plurality of hash codes that match the at least one hash code of the second plurality of hash codes.

14. The one or more non-transitory computer-readable media of claim 13, the acts further comprising providing the first digital item for acquisition at a merchant site based at least in part on the amount of duplicate content in the first digital item.

15. The one or more non-transitory computer-readable media of claim 13, the acts further comprising selecting the first digital item for manual review based on the amount of duplicate content in the first digital item.

16. The one or more non-transitory computer-readable media of claim 13, the acts further comprising:
comparing the first plurality of sets of words with a second plurality of sets of words corresponding to the second digital item; and
determining whether one or more of the first plurality of sets of words match the second plurality of sets of words.

17. The one or more non-transitory computer-readable media of claim 16, wherein:
calculating the reverse score comprises dividing the number of the second plurality of hash codes that match at least one hash code of the first plurality of hash codes by a total number of the second plurality of hash codes; and
calculating the forward score comprises dividing the number of the first plurality of hash codes that match at least one hash code of the second plurality of hash codes by a total number of the first plurality of hash codes.

18. The one or more non-transitory computer-readable media of claim 13, the acts further comprising placing the first digital item in a queue for manual review in response to determining at least one of:
 the forward score exceeds a first threshold; or
 the reverse score exceeds a second threshold.

19. The one or more non-transitory computer-readable media of claim 13, the acts further comprising providing the first digital item for acquisition at a merchant site based on at least one of the forward score or the reverse score.

20. The one or more non-transitory computer-readable media of claim 19, the acts further comprising sending a notification to an electronic address associated with the first digital item in response to determining that the first digital item is unsuitable for publication, the notification indicating that the first digital item is unsuitable for publication.

21. The one or more non-transitory computer-readable media of claim 13, wherein selecting the first plurality of sets of words from the first digital item comprises:
 determining whether the first digital item includes one or more stop words; and
 excluding the one or more stop words when selecting the first plurality of sets of words from the first digital item, each of the sets of words including a predetermined number of consecutive words.

22. A method under control of one or more processors configured with specific instructions, the method comprising:
 receiving a request to publish a first digital item that includes text;
 selecting a first plurality of sets of words from the text;
 computing a first plurality of hash codes, wherein each hash code of the first plurality of hash codes corresponds to a set of words of the first plurality of sets of words;
 comparing the first plurality of hash codes with stored hash codes associated with other digital items;
 selecting a second digital item from the other digital items based at least in part on the comparing;
 determining a number of the first plurality of hash codes that match a hash code of a second plurality of hash codes corresponding to the second digital item;
 determining a number of the second plurality of hash codes that match a hash code of the first plurality of hash codes;
 determining whether the first digital item includes duplicate content based at least in part on a forward score and a reverse score, wherein the forward score indicates an amount of the first digital item that is included in the second digital item based at least in part on the number of the first plurality of hash codes that match the hash codes of the second plurality of hash codes, and the reverse score indicates an amount of the second digital item that is included in the first digital item based at least in part on the number of the second plurality of hash codes that match the hash codes of the first plurality of hash codes; and
 providing the first digital item for acquisition at a merchant site when an amount of the duplicate content in the first digital item is determined to be less than a predetermined threshold.

23. The method of claim 22, wherein the forward score is determined by dividing a total number of the first plurality of hash codes that match the second plurality of hash codes by a total number of the second plurality of hash codes.

24. The method of claim 22, wherein the reverse score is determined by dividing a total number of the second plurality of hash codes that match the first plurality of hash codes by the total number of the first plurality of hash codes.

25. The method of claim 24, wherein a set of words has less than the predetermined number of words in a common with a previous set of words or a subsequent set of words.

26. The method of claim 22, wherein at least one of the first plurality of hash codes or the second plurality of hash codes is determined based on a message digest algorithm.

27. The method of claim 22, further comprising:
 comparing the first plurality of hash codes of the first digital item with previous hash codes associated with a previous version of the first digital item, the previous version received at a time that was prior to receiving the first digital item; and
 detecting, based on the comparing, whether an upload error occurred.

28. The method of claim 27, further comprising:
 in response to detecting the upload error, sending a request to a submitter device to resubmit the first digital item.

\* \* \* \* \*